(12) United States Patent
Hjerpe et al.

(10) Patent No.: US 12,485,646 B2
(45) Date of Patent: Dec. 2, 2025

(54) MANUFACTURING OF AN INFLATABLE STRUCTURE

(71) Applicant: Volvo Car Corporation, Gothenburg (SE)

(72) Inventors: Erik Hjerpe, Torslanda (SE); Nathan Nuzzo, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 880 days.

(21) Appl. No.: 16/827,766

(22) Filed: Mar. 24, 2020

(65) Prior Publication Data

US 2020/0307154 A1    Oct. 1, 2020

(30) Foreign Application Priority Data

Apr. 1, 2019    (EP) .................................... 19166581

(51) Int. Cl.
*B32B 7/09*    (2019.01)
*B32B 5/02*    (2006.01)
(Continued)

(52) U.S. Cl.
CPC .................. *B32B 7/09* (2019.01); *B32B 5/02* (2013.01); *B32B 5/26* (2013.01); *B32B 27/06* (2013.01);
(Continued)

(58) Field of Classification Search
CPC ....... B32B 37/16; B32B 37/0076; B32B 5/26; B32B 5/02; B32B 27/12; B32B 27/06;
(Continued)

(56) References Cited

U.S. PATENT DOCUMENTS

| | | | |
|---|---|---|---|
| 2,657,716 A | | 11/1953 | Ford |
| 2,743,510 A | * | 5/1956 | Mauney ............... A47C 27/087 |
| | | | 428/101 |

(Continued)

FOREIGN PATENT DOCUMENTS

| | | |
|---|---|---|
| CN | 1463232 A | 12/2003 |
| CN | 101330945 A | 12/2008 |

(Continued)

OTHER PUBLICATIONS

Jul. 21, 2021 Office Action issued in corresponding Chinese patent application CN202010248887A.

(Continued)

*Primary Examiner* — Katherine A Bareford
(74) *Attorney, Agent, or Firm* — Clements Bernard Walker; Christopher L. Bernard

(57) ABSTRACT

The present disclosure relates to manufacturing an inflatable structure. There is determined one or more contours of at least a portion of an inflatable structure to be manufactured. There is further provided a drop stitch fabric having a first layer and a second layer tethered by drop stitches. Moreover, there is provided along at least a portion of the drop stitch fabric one or more fixation lines comprising coupling means fixating the first layer to the second layer, the one or more fixation lines corresponding to the one or more contours. Furthermore, the drop stitch fabric is coated, wherein one or more coating layers cover at least the one or more fixation lines. The disclosure also relates to an inflatable structure manufactured according to the foregoing, and a control system for controlling said manufacturing.

11 Claims, 5 Drawing Sheets

(51) Int. Cl.
  *B32B 5/26* (2006.01)
  *B32B 27/06* (2006.01)
  *B32B 27/12* (2006.01)
  *B32B 37/00* (2006.01)
  *B32B 37/16* (2006.01)
  *B32B 38/00* (2006.01)
  *B32B 41/00* (2006.01)
  *D05B 21/00* (2006.01)
  *D06H 7/00* (2006.01)
  *D06N 3/00* (2006.01)

(52) U.S. Cl.
  CPC .......... *B32B 27/12* (2013.01); *B32B 37/0076* (2013.01); *B32B 37/16* (2013.01); *B32B 38/0004* (2013.01); *B32B 41/00* (2013.01); *D05B 21/00* (2013.01); *D06H 7/00* (2013.01); *D06N 3/0013* (2013.01); *D06N 3/0088* (2013.01); *B32B 2038/008* (2013.01); *B32B 2250/40* (2013.01); *B32B 2255/02* (2013.01); *B32B 2305/18* (2013.01); *B32B 2309/70* (2013.01)

(58) Field of Classification Search
  CPC ....... B32B 41/00; B32B 38/0004; B32B 7/09; B32B 2309/70; B32B 2255/02; B32B 2038/008; B32B 2305/18; B32B 2250/40; D06N 3/0088; D06N 3/0013; D06H 7/00; D05B 21/00; B29B 22/02; B29L 2022/02; B60N 2002/2896
  See application file for complete search history.

(56) References Cited

U.S. PATENT DOCUMENTS

| | | | | |
|---|---|---|---|---|
| 5,791,958 A | * | 8/1998 | Yeung | A47C 15/006 441/130 |
| 6,460,541 B1 | * | 10/2002 | Shah | A61F 5/41 128/845 |
| 8,353,530 B2 | | 1/2013 | Czach et al. | |
| 2002/0036045 A1 | * | 3/2002 | Volpi | B29D 30/0016 152/526 |
| 2002/0140218 A1 | * | 10/2002 | Beasley, Jr. | B60R 21/231 280/743.1 |
| 2007/0162176 A1 | * | 7/2007 | Peyser | A41D 27/08 700/138 |
| 2011/0056017 A1 | * | 3/2011 | Schreiber | A61G 7/1028 5/709 |
| 2012/0011642 A1 | * | 1/2012 | Dainese | B62J 27/20 2/455 |
| 2014/0265275 A1 | * | 9/2014 | Rickenbach | B60R 21/233 280/739 |
| 2016/0095777 A1 | * | 4/2016 | Berman | A61G 7/1026 5/81.1 T |
| 2018/0208272 A1 | | 7/2018 | Hopkins | |

FOREIGN PATENT DOCUMENTS

| | | | |
|---|---|---|---|
| CN | 203063891 U | | 7/2013 |
| CN | 107567401 A | | 1/2018 |
| EP | 2502780 A1 | | 9/2012 |
| EP | 3167730 A1 | | 5/2017 |
| JP | S5388887 A | | 8/1978 |
| JP | 10-129380 | * | 5/1998 |
| KR | 20190004053 A | | 1/2019 |
| WO | 2016145239 A1 | | 9/2016 |

OTHER PUBLICATIONS

Sep. 17, 2019 European Search Report Issued on International Application 19166581.

* cited by examiner

MANUFACTURING OF AN INFLATABLE STRUCTURE

CROSS-REFERENCE TO RELATED APPLICATION

The present disclosure claims the benefit of priority of co-pending European Patent Application No. 19166581.9, filed on Apr. 1, 2019, and entitled "MANUFACTURING OF AN INFLATABLE STRUCTURE," the contents of which are incorporated in full by reference herein.

TECHNICAL FIELD

The present disclosure relates to efficient manufacturing of an inflatable structure.

BACKGROUND

Products based on inflatable drop stitch technology are becoming increasingly popular, not the least since such products—e.g. kayaks, floats, gym mats etc.—when deflated, may be less bulky and hence more easily stored and/or transported, and further, be less heavy and/or less costly, than corresponding products of traditional material. Commonly, an inflatable drop stitch may be e.g. a PVC-coated and/or laminated nylon and/or polyester fabric with layers joined by a dense array of e.g. vertical linear and/or zigzag fibers and/or polyester strands that are uniform in size. When the inflatable drop stitch then is adapted—e.g. glued and/or welded—into desired shape, and subsequently pressurized with air, it may be transformed into a strong, firm structure. The vertical fibers and/or strands—which may be referred to as the drop stitches—hold the air chamber firmly in shape, thus allowing the inflated structure to maintain its shape and stability under heavy outside pressure and impact.

When manufacturing an inflatable drop stitch product, a drop stitch fabric is commonly coated and/or impregnated prior to a contour of the drop stitch product being cut out from said fabric, followed by welding and/or sealing—e.g. by means of patches—edges around the perimeter inflatable drop stitch product, to enable the said product to be airtight and/or gas proof. Such a manufacturing process may, however, be time consuming as well as complex, and further come at a high production cost.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended dependent claims, in the following description and in the drawings.

The disclosed subject matter relates to a method for manufacturing an inflatable structure. There is determined one or more contours of at least a portion of an inflatable structure to be manufactured. Moreover, there is provided a drop stitch fabric having a first layer and a second layer tethered by drop stitches. Furthermore, there is provided along at least a portion of the drop stitch fabric one or more fixation lines comprising coupling means fixating the first layer to the second layer, the one or more fixation lines corresponding to the one or more contours. The drop stitch fabric is further coated, wherein one or more coating layers cover at least the one or more fixation lines.

The disclosed subject matter further relates to an inflatable structure manufactured in accordance with the foregoing.

Moreover, he disclosed subject matter relates to a control system for controlling manufacturing of an inflatable structure. The control system comprises a contour determining unit for determining one or more contours of at least a portion of an inflatable structure to be manufactured. Furthermore, the control system comprises a drop stitch controlling unit for controlling drop stitching of a drop stitch fabric having a first layer and a second layer tethered by drop stitches. Moreover, the control system comprises a coupling controlling unit for controlling provision along at least a portion of the drop stitch fabric of one or more fixation lines comprising coupling means fixating the first layer to the second layer, the one or more fixation lines corresponding to the one or more contours. The control system further comprises a coating controlling unit for controlling coating of the drop stitch fabric, wherein one or more coating layers cover at least the one or more fixation lines.

Furthermore, the disclosed subject matter relates to by a computer program product comprising a computer program containing computer program code means arranged to cause a computer or a processor to execute the manufacturing steps discussed above, stored on a computer-readable medium or a carrier wave Thereby, there is introduced an approach for manufacturing an inflatable structure which is more efficient than commonly known manufacturing approaches. That is, since there is determined one or more contours of at least a portion of an inflatable structure to be manufactured, contours—i.e. outer and/or inner perimeters and/or edges—of a planned inflatable structure, may be defined. Moreover, that is, since there is provided a drop stitch fabric having a first layer and a second layer tethered by drop stitches, the inflatable structure has the potential to in an inflated state be transformed into a strong, firm structure. Furthermore, that is, since there is provided along at least a portion of the drop stitch fabric one or more fixation lines comprising coupling means fixating the first layer to the second layer, which one or more fixation lines correspond to the one or more contours, in addition to the drop stitches tethering the first layer to the second layer, coupling means of one or more fixation lines additionally couple the first layer to the second layer. As a result thereof, since the fixation lines reflect the one or more contours of the inflatable structure being manufactured, edges of inner and/or outer perimeters of said structure are formed and bonded. Subsequently, a geometry of the inflatable structure is thereby defined and fixed by the one or more fixation lines, thus rendering the drop stitch fabric thereof more easily manageable for further processing thereof. For instance, shifting and/or sliding of the first layer relative the second layer—e.g. during continued manufacturing and/or handling—may be avoided, and/or drop stitches in vicinity of the one or more contours and/or fixation lines may be locked in by the coupling means, thus preventing said drop stitches from sticking out beyond the one or more fixation lines and potentially be damaged e.g. during continued manufacturing and/or handling of the inflatable structure and/or the drop stitch fabric thereof. Further, more complicated inflatable structures may then be provided, having more complicated inner and/or outer contours e.g. irregular contours. Moreover, that is, since the drop stitch fabric is coated, wherein one or more coating layers cover at least the one or more fixation lines, the first layer and the second layer has been bonded along the contours of the inflatable structure prior to the drop stitch fabric being coated, and accordingly, the one or more fixation lines are coated together with the coating of the drop stitch fabric. The contours of the inflatable structure thereby become sealed, thus rendering subsequent—commonly known—additional patching and/or sealing unnecessary. That is, rather than—as known in the art—cutting out a contour of a drop stitch product from a drop stitch fabric after coating of said fabric, thus implying that subsequent welding and/or sealing—e.g. by means of patches—of contour edges is required to enable said product to be airtight and/or gas proof, the introduced approach makes such subsequent welding and/or sealing unneeded. Accordingly, a more efficient manufacturing process is provided.

The technical features and corresponding advantages will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
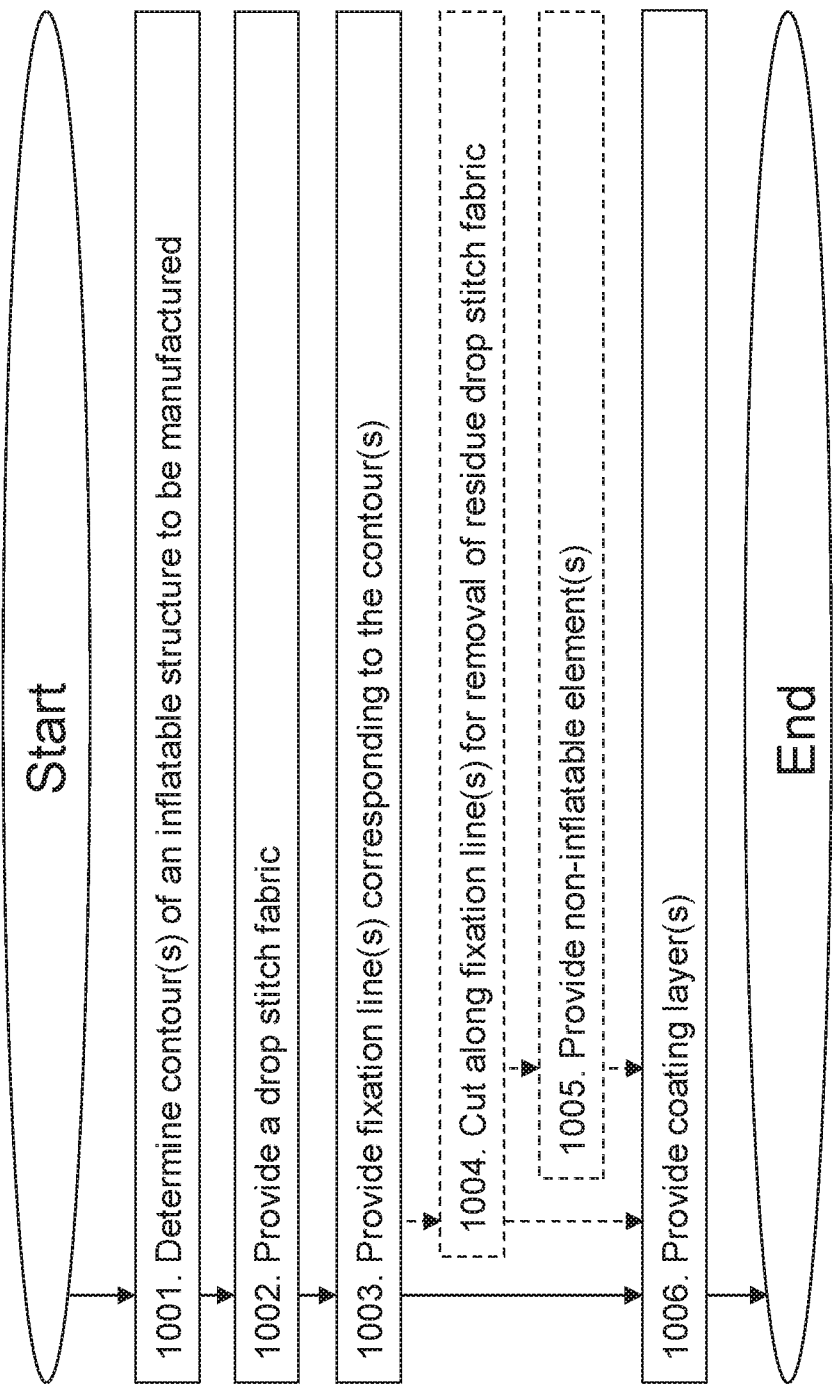
FIG. 1 is a flowchart depicting an exemplifying manufacturing method according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to manufacturing of an inflatable structure, there will be disclosed an approach for manufacturing an inflatable structure which is more efficient than commonly known manufacturing approaches.

Referring now to the figures and FIG. 1 in particular, there is depicted a flowchart of an exemplifying manufacturing method according to embodiments of the disclosure. The exemplifying method comprises the following action(s) discussed with support from FIGS. 2-5. One or more actions may be performed simultaneously and/or in an alternate order; for instance, optional Action 1005 and/or Action 1006 may be performed prior to and/or simultaneous with optional Action 1004. Moreover, optional Action 1005 may potentially be performed prior to Action 1003.

Figure 5:
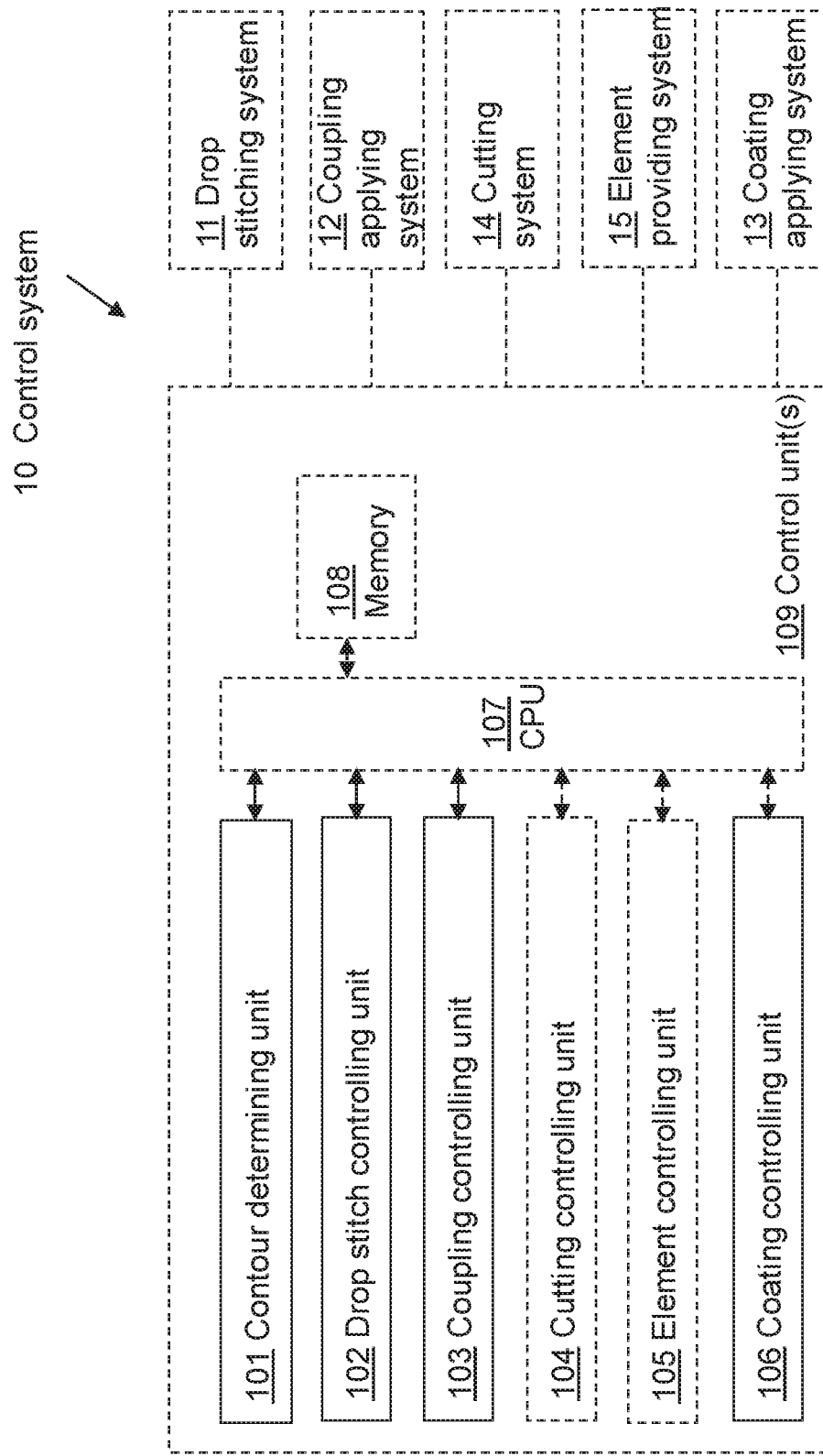
FIG. 5 is a schematic block diagram illustrating an exemplifying control system according to embodiments of the disclosure.

The manufacturing method may potentially be controlled by a control system 10, and an example of such a control system 10 is demonstrated in FIG. 5, which depicts a schematic block diagram illustrating an exemplifying control system 10 according to embodiments of the disclosure.

Figure 2:
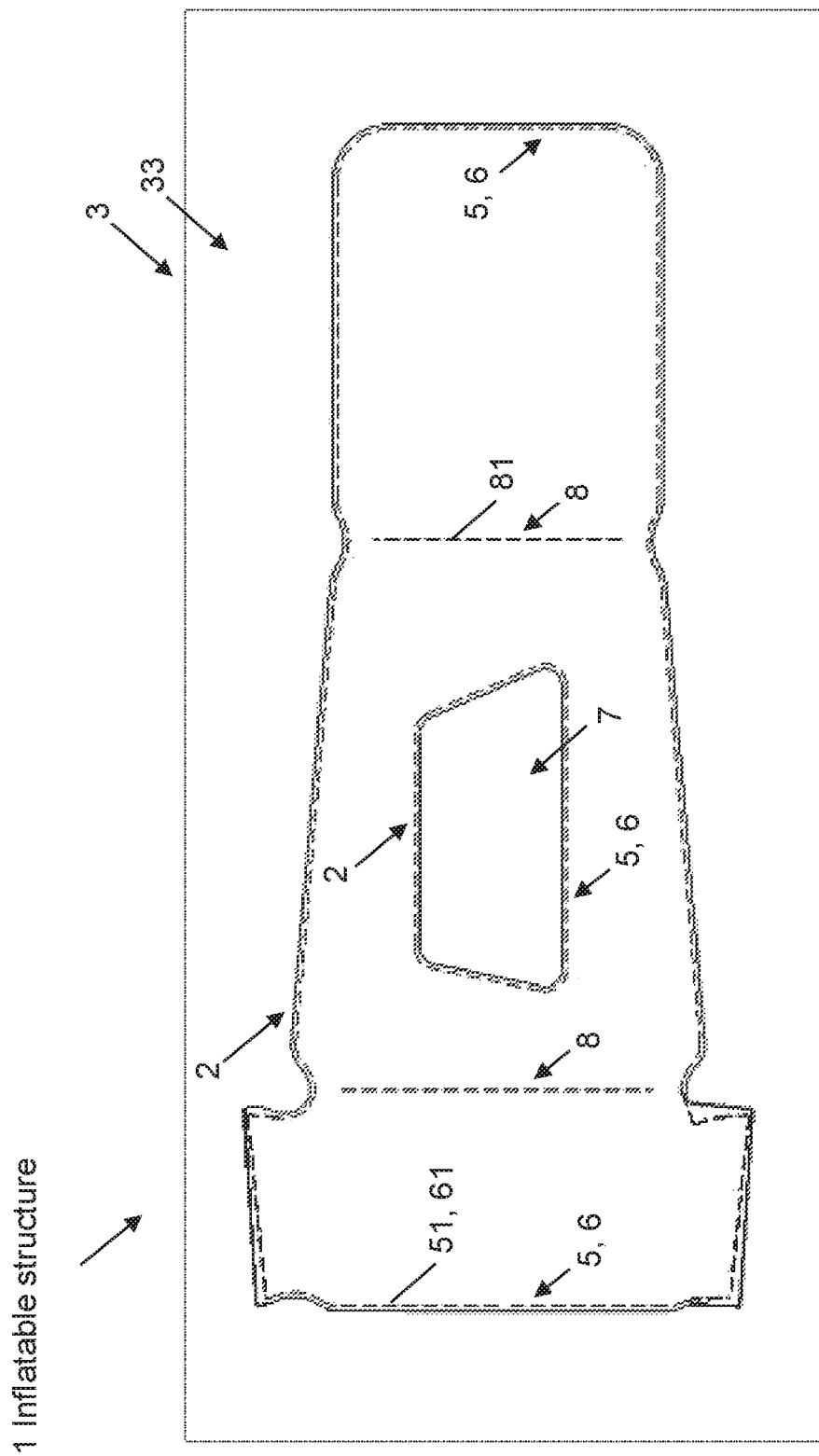
FIG. 2 illustrates a schematic top view of a portion of an exemplifying inflatable structure according to embodiments of the disclosure.

The method exemplified in FIG. 1 is for manufacturing an inflatable structure 1, and an example of such an inflatable structure 1 is depicted in FIG. 2, which illustrates a schematic top view of a portion of an exemplifying inflatable structure 1 according to embodiments of the disclosure. The inflatable structure 1 may be represented by any inflatable product and/or article deemed feasible and/or applicable for the introduced approach. The inflatable structure 1 may thus for instance be represented by an inflatable pet cage or the like, which further for instance may be carried on-board a vehicle such as—e.g. in the inflated state—placed in a luggage compartment thereof. According to another example, the inflatable structure may be represented by an inflatable child seat. The expression "inflatable" may refer to "pressurizable", whereas "structure" may refer to "arrangement", "article", "product" and/or "body". Method for "manufacturing" an inflatable structure, on the other hand, may refer to method for "providing" and/or "producing" an inflatable structure, whereas "manufacturing an inflatable structure" may refer to "manufacturing an inflatable structure comprising a drop stitch fabric" and/or "manufacturing an inflatable structure from a drop stitch fabric".

The inflatable structure 1 may be transformable at least between a deflated state and an inflated state in a commonly known manner, and subsequently, the expression "manufacturing an inflatable structure" may refer to "manufacturing an inflatable structure transformable between a deflated state and an inflated state". The deflated state may refer to a condition of the inflatable structure 1 in which the inflatable structure 1 is not pressurized, and may for instance be desirable for storage and/or transportation of the inflatable structure 1. Correspondingly, the inflated state may refer to a condition of the inflatable structure 1 in which the inflatable structure 1 is pressurized—e.g. at least up to a predetermined and/or predetermineable value, pressure and/or percentage of e.g. a maximum potential pressure to which the inflatable structure 1 may be inflated—and which state further may be referred to as a state for intended use of the inflatable structure 1.

The expression "inflatable structure transformable" between a deflated and an inflated state, may refer to "inflatable structure adapted to transition and/or change" between a deflated and an inflated state. "Deflated" state, on the other hand, may refer to "unpressurized" state and/or "storage and/or transportation" state, whereas "inflated" state may refer to "pressurized" state and/or "usage and/or intended use" state. The expression "state" may refer to "condition" and/or "mode".

Action 1001: In Action 1001, there is determined one or more contours 2 of at least a portion of an inflatable structure 1 to be manufactured. Thereby, contours 2—i.e. outer and/or inner perimeters and/or edges—of a planned inflatable structure 1, may be defined.

The contours 2 are given by the desired shape and/or geometry of the planned inflatable structure 1, and may take on any dimensions rendered by said inflatable structure 1. The contours may accordingly be a combination of straight and curved lines, with corners and/or angles as defined by the shape and/or geometry of the inflatable structure 1 to be manufactured.

The expression "determining" one or more contours may refer to "defining", "calculating", "deriving" and/or "setting" one or more contours, whereas "contours" may refer to "perimeters", "edges", "inner and/or outer contours", "top view contours", "side contours", "cross section contours" and/or "contours in the deflated state". "Of at least a portion of" an inflatable structure, on the other hand, may refer to "of at least a section of", "of one or more chambers of" and/or merely "of" an inflatable structure, whereas "an inflatable structure to be manufactured" may refer to merely "the inflatable structure".

Action 1001 of determining one or more contours 2 may potentially be determined by means of a contour determining unit 101 of the control system 10 (shown in FIG. 5).

Figure 3:
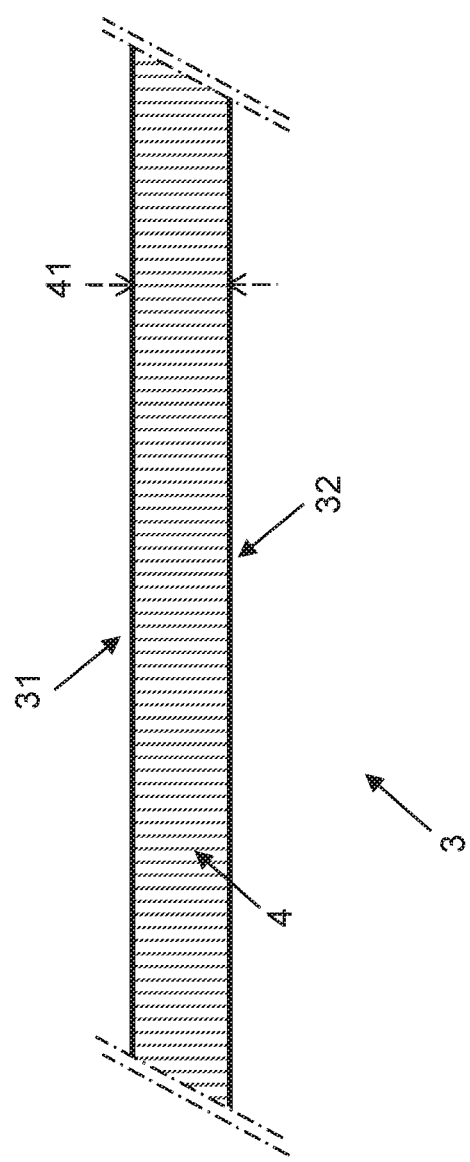
FIG. 3 illustrates a schematic side view of a portion of an exemplifying drop stitch fabric according to embodiments of the disclosure.
Figure 4:
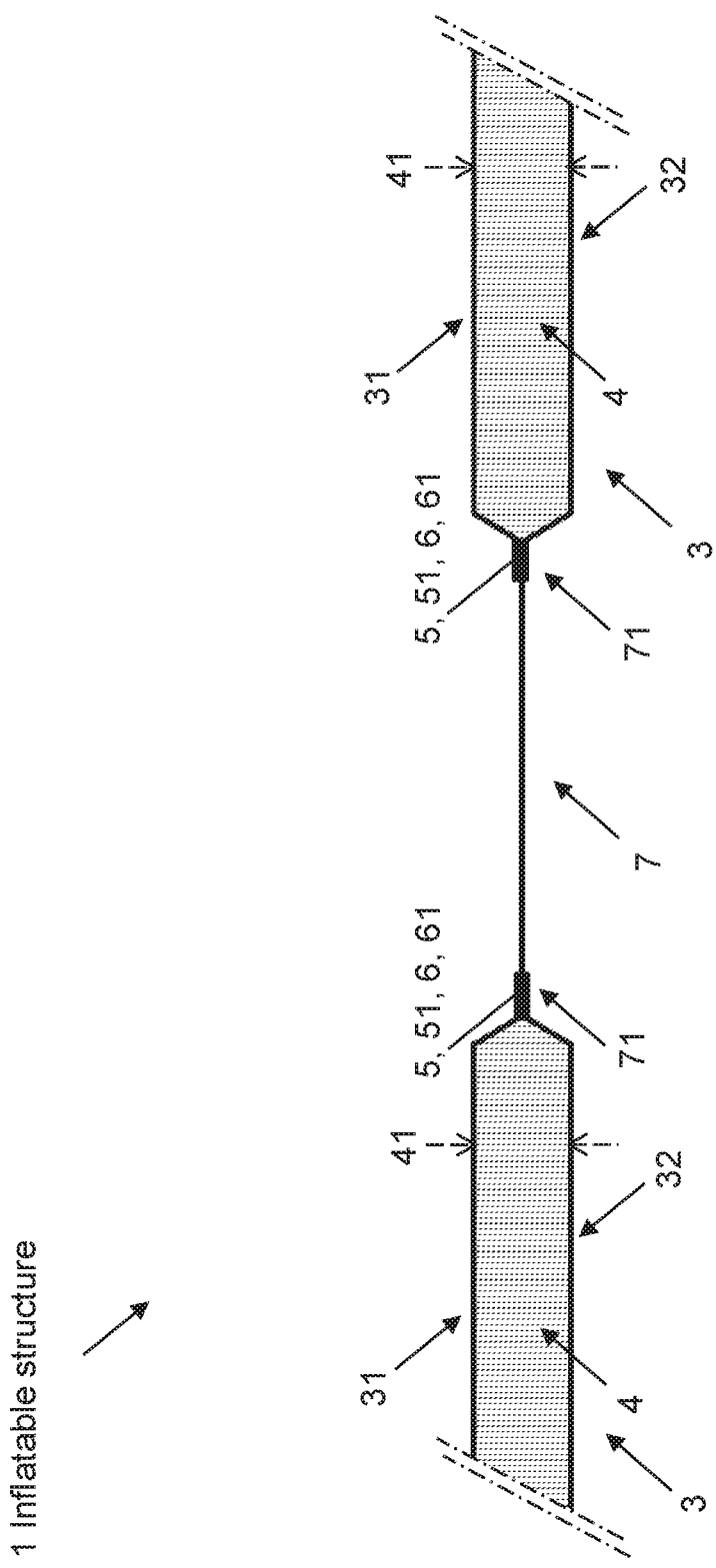
FIG. 4 illustrates a schematic side view of a portion of an exemplifying inflatable structure according to embodiments of the disclosure.

Action 1002: In Action 1002, there is provided a drop stitch fabric 3 having a first layer 31 and a second layer 32 tethered by drop stitches 4, and an example of such a drop stitch fabric 3 is depicted in FIG. 3, which illustrates illustrates a schematic side view of a portion of an exemplifying drop stitch fabric 3 according to embodiments of the disclosure.

Thereby, the inflatable structure 1 has the potential to in an inflated state be transformed into a strong, firm structure. That is, the drop stitches 4 may in the inflated state hold the inflatable structure 1 firmly in shape, thus allowing the inflatable structure 1 to maintain its shape and stability under heavy outside pressure and impact.

The drop stitch fabric 3, the first layer 31, the second layer 32 and the drop stitches 4 may be provided and/or manufactured—and/or have been manufactured—in any commonly known manner, for instance with support from a—potentially known—drop stitching system and/or machine 11 (shown in FIG. 5), e.g. a weaving, sewing, stitching and/or loom machine and/or system.

Moreover, the drop stitch fabric 3 may refer to any drop stitch fabric commonly known in the art, and be of any dimensions—e.g. width and/or length—deemed suitable for the inflatable structure 1 at hand, e.g. range from tens of millimetres up to tens of metres. In a similar manner, the first layer 31 and the second layer 32 may refer to any drop stitch layers commonly known, and be of any thickness deemed suitable for the inflatable structure 1 at hand, e.g. range from tenths of millimetres up to several millimetres, and/or comprise any material commonly known, such as for instance nylon and/or polyester. Moreover, the first layer 31 and/or the second layer 32 may each be represented by a respective set of layers lying on top of another in a known manner, which layers may or may not comprise different materials. Yet again, in a similar manner, the drop stitches 4 may be represented by any drop stitches known in the art, e.g. be represented by fibers, strands and/or threads e.g. comprising polyester material and moreover e.g. be provided in a linear, zigzag and/or random pattern. The drop stitches 4 may further be of any dimensions and/or characteristics deemed suitable for the inflatable structure 1 at hand, and for instance may a length of the drop stitches 4, i.e. a drop stitches length 41, range from a few millimetres up to hundreds of millimetres. The drop stitches 4 may in a commonly known manner extend through the first layer 31 and the second layer 32, and further—should the first 31 and/or the second 32 layer be represented by a respective set of layer—then the drop stitches 4 may extend through one, a few or all of the layers in the respective set.

The expression "providing" a drop stitch fabric may refer to "drop stitching" a drop stitch fabric, and further to "providing with support from a drop stitching system and/or machine" a drop stitch fabric, whereas the expression "providing a drop stitch fabric having a first layer and a second layer" may refer to "providing a drop stitch fabric intended to be comprised in the inflatable product, the drop stitch fabric having a first layer and a second layer". The expression "drop stitch fabric" may refer to "uniform, integral and/or undivided drop stitch fabric", "drop stitch fabric with a uniform extension area" and/or "two-layer fabric", whereas "fabric" may refer to "material" and/or "cloth". The expression "layer", on the other hand, may refer to "set of parallel layers and/or "essentially and/or at least partly parallel layers", whereas "tethered" by drop stitches may refer to "tethered by a dense array" of drop stitches and further to "coupled", "joined" and/or "held" by drop stitches. "Drop stitches" may refer to "spacer threads" and/or "vertical stitches", and further to "drop stitches there between".

According to an example, optionally, the expression "providing a drop stitch fabric having a first layer and a second layer tethered by drop stitches" may refer to "providing a one piece drop stitch fabric having a first layer and a second layer tethered by drop stitches, a layer area of the drop stitch fabric exceeding outer contours out of the one or more contours of the inflatable structure". Accordingly, the drop stitch fabric 3 may according to this example be represented by a single drop stitch fabric having a layer area 33 greater than an area defined by outer contours 2 of the inflatable structure 1. Thereby, the inflatable structure 1 may be manufactured from a single piece of drop stitch fabric 3, rather than be composed of two or more pieces of drop stitch fabric, which however also would be feasible. The expression "one piece" drop stitch fabric may refer to "single" drop stitch fabric, whereas "layer area" of the drop stitch fabric may refer to "layer surface area" of the drop stitch fabric. "Area of the drop stitch fabric", on the other hand, may refer to "area of the first layer and/or the second layer of the drop stitch fabric".

Action 1002 of providing a drop stitch fabric 3 may potentially be controlled by means of a drop stitch controlling unit 102 of the control system 10 (shown in FIG. 5).

Action 1003: In Action 1003, there is provided along at least a portion of the drop stitch fabric 3 one or more fixation lines 5 comprising coupling means 51 fixating the first layer 31 to the second layer 32, the one or more fixation lines 5 corresponding to the one or more contours 2. Thereby, in addition to the drop stitches 4 tethering the first layer 31 to the second layer 32, coupling means 51 of one or more fixation lines 5 additionally couple the first layer 31 to the second layer 32. As a result thereof, since the fixation lines 5 reflect the one or more contours 2 of the inflatable structure 1 being manufactured, edges of inner and/or outer perimeters of said structure 1 are formed and bonded. Subsequently, a geometry of the inflatable structure 1 is thereby defined and fixed by the one or more fixation lines 5, thus rendering the drop stitch fabric 3 thereof 1 more easily manageable for further processing thereof. For instance, shifting and/or sliding of the first layer 31 relative the second layer 32—e.g. during continued manufacturing and/or handling—may be avoided, and/or drop stitches 4 in vicinity of the one or more contours 2 and/or fixation lines 5 may be locked in by the coupling means 51, thus preventing said drop stitches from sticking out beyond the one or more fixation lines 5 and potentially be damaged e.g. during continued manufacturing and/or handling of the inflatable structure 1 and/or the drop stitch fabric 3 thereof. Further, more complicated inflatable structures may then be provided, having more complicated inner and/or outer contours e.g. irregular contours.

The one or more fixation lines 5 may mirror, follow and/or be parallel to the one or more contours 2 along the entire inflatable structure 1, or portions thereof. Additionally or alternatively, the one or more fixation lines 5 may, as shown in FIG. 2, slightly deviate from the one or more contours 2, for instance with any preselectable offset margin deemed suitable for the inflatable structure 1 at hand, e.g. ranging from tenths of millimetres up to tens of millimetres. The coupling means 51 may be represented by any coupling members enabling the first layer 31 to be coupled, attached and/or fixated to the second layer 32 along the one or more fixation lines 5. Similarly, dimensions of the one or more fixation lines 5 and/or coupling means 51 may be selected in any manner deemed suitable for enabling the first layer 31 to be coupled, attached and/or fixated to the second layer 32 along the one or more fixation lines 5. Such dimensions may for instance relate to magnitudes of the one or more fixation lines 5 and/or coupling means 51, such as a width of a fixation line 5, to what extent a coupling means 51 extends, and/or a separation distance between two adjacent coupling means 51. The coupling means 51 may, or may not, leave a slight gap between the first layer 31 and the second layer 32. Two or more of the one or more fixation lines 5 may potentially at least partly be parallel or essentially parallel.

The one or more fixation lines 5, and subsequently the coupling means 51, may be provided in any manner deemed suitable for the inflatable structure 1 at hand, e.g. with support from a—potentially known—coupling applying system and/or machine 12, and/or potentially by hand.

Providing one or more fixation lines 5 may, according to an example, comprise—and/or be represented by—providing one or more welding lines. The coupling means 51 may then comprise and/or be represented by welds and/or weld spots, and further, an optional coupling applying system and/or machine 12 hence for instance be represented by a commonly known welding machine.

Optionally, however, providing one or more fixation lines 5 may comprise—and/or be represented by—providing one or more seams 6 comprising stitches 61. Thereby, in addition to the drop stitches 4 tethering the first layer 31 to the second layer 32, coupling stitches 61 of one or more seams 6—which may be referred to as sewing lines 6—additionally couple the first layer 31 to the second layer 32. As a result thereof, since the seam(s) 6 reflects the one or more contours 2 of the inflatable structure 1 being manufactured, edges of inner and/or outer perimeters of said structure 1 are formed and bonded by means of the coupling stitches 61 thereof 6. The one or more seams 6, and subsequently the stitches 61, may be provided in any manner deemed suitable for the inflatable structure 1 at hand, e.g. with support from a—potentially known—sewing system and/or machine 12, and/or potentially by hand.

The expression "providing" one or more fixation lines may refer to "applying" one or more fixation lines, and further to "providing with support from a coupling applying system and/or machine" one or more fixation lines. Moreover, "providing" may according to an example refer to "providing, prior to coating and/or cutting of the drop stitch fabric". The expression "along" at least a portion, on the other hand, may refer to "extending along" at least a portion and/or "at" and/or "in" at least a portion, whereas "portion" may refer to "segment". The expression "providing along at least a portion of the drop stitch fabric" one or more fixation lines may refer to merely "providing" one or more fixation lines, whereas "fixation line" may refer to "coupling, bonding and/or sealing line". Fixation "line", on the other hand, may refer to fixation "extension", whereas fixation line comprising "coupling means" may refer to fixation line comprising "coupling members", "couplings" and/or "couplers". According to an example, the one or more "fixation lines" may refer to the one or more "seams and/or welding lines", and subsequently, the "coupling means" may then optionally refer to "welds, welding spots and/or stitches". The expression "fixating" the first layer to the second layer may refer to "attaching", "bonding" and/or "coupling" the first layer to the second layer, and/or "coupling narrower and/or tighter than the drop stitches" the first layer to the second layer. The one or more fixation lines "corresponding to" the one or more contours, on the other hand, may refer to the one or more fixation lines "reflecting", "mirroring" and/or "representing" the one or more contours.

Action 1003 of providing one or more fixation lines 5 may potentially be controlled by means of a coupling controlling unit 103 of the control system 10 (shown in FIG. 5).

Action 1006: In Action 1006, the drop stitch fabric 3 is coated, wherein one or more coating layers cover at least the one or more fixation lines 5. Thereby, the first layer 31 and the second layer 32 has been bonded along the contours 2 of the inflatable structure 1 prior to the drop stitch fabric 3 being coated, and accordingly, the one or more fixation lines 5 are coated together with the coating of the drop stitch fabric 3. The contours 2 of the inflatable structure 1 thereby become sealed, thus rendering subsequent—commonly known—additional patching and/or sealing unnecessary. That is, rather than—as known in the art—cutting out a contour of a drop stitch product from a drop stitch fabric after coating of said fabric, thus implying that subsequent welding and/or sealing—e.g. by means of patches—of contour edges is required to enable said product to be airtight and/or gas proof, the introduced approach makes such subsequent welding and/or sealing unneeded. Accordingly, a more efficient manufacturing process is provided.

Coating of the drop stitch fabric 3 may be accomplished in any manner deemed suitable for the inflatable structure 1 at hand, e.g. with support from a—potentially known—coating applying system and/or machine 13 (shown in FIG. 5), and/or potentially by hand. The one or more coating layers may be represented by any known layers of coating, e.g. PVC, urethane and/or Hypalon.

The expression "coating the drop stitch fabric" may refer to "coating at least a portion of the drop stitch fabric", "applying coating on the drop stitch fabric" and/or "providing the drop stitch fabric with coating and/or one or more coating layers", and further to "coating the drop stitch fabric comprised in the inflatable structure". "Coating the drop stitch fabric" may further refer to "coating the drop stitch fabric with support from a coating applying system and/or machine". Moreover, "coating" may refer to "coating, subsequent and/or after providing the one or more fixation lines". According to an example, the phrase "wherein one or more coating layers cover at least the one or more fixation lines" may refer to "wherein one or more coating layers cover at least the one or more fixation lines, such that the inflatable structure and/or the drop stitch fabric thereof become airtight and/or gas proof".

Action 1006 of coating the drop stitch fabric 3 may potentially be controlled by means of a coating controlling unit 106 of the control system 10 (shown in FIG. 5).

Action 1004: In optional Action 1004—which may follow upon Action 1003 of providing one or more fixation lines 5, upon optional Action 1005 to be describe further on, and/or upon Action 1006 of coating the drop stitch fabric 3—residual drop stitch fabric may be removed by cutting along at least a portion the one or more fixation lines 5. Thereby, drop stitch fabric not being part of the planned inflatable structure 1, may be separated from the planned inflatable structure 1.

Moreover, thereby, since the residue drop stitch fabric then is removed after the first layer 31 and the second layer 32 has been bonded along the contours 2 of the inflatable structure 1 by means of the coupling means 51, unintentional damaging—such as e.g. cutting—of drop stitches 4 located in the vicinity of the one or more fixation lines 5, may be avoided.

Cutting along the one or more fixation lines 5 may be accomplished in any manner deemed suitable for the inflatable structure 1 at hand, e.g. with support from a—potentially known—cutting system and/or machine 14 (shown in FIG. 5), e.g. comprising one or a plurality of cutting means such as knifes, and/or potentially by hand such as by means of e.g. a knife and/or scissors. Cutting may be provided with a slight deviation from the one or more fixation lines 5, for instance with any preselectable offset margin deemed suitable for the inflatable structure 1 at hand, e.g. ranging from tenths of millimetres up to tens of millimetres. Residue drop stitch fabric may refer to any portions of the drop stitch fabric 3 located outside and/or beyond the one or more fixation lines 5 of an inner and/or outer perimeter, thus not part of the planned inflatable structure 1.

The expression "cutting" may refer to "slitting" and/or carving, and further to "cutting with support from a cutting system and/or machine". Moreover, "cutting" may refer to "cutting, subsequent and/or after providing one or more fixation lines". Cutting "along", on the other hand, may refer to cutting "essentially along", cutting "parallel to" and/or cutting "with on offset margin along", whereas "residual drop stitch fabric" may refer to "superfluous and/or redundant drop stitch fabric" and/or "drop stitch fabric residual". The expression "for removal of" residual drop stitch fabric may refer to "to remove" and/or "and removing" residual drop stitch fabric". According to an example, the phrase "cutting along at least a portion the one or more fixation lines for removal of residual drop stitch fabric" may refer to "removing residue drop stitch fabric located beyond the one or more fixation lines".

Action 1004 of cutting along at least a portion the one or more fixation lines 5 may potentially be controlled by means of a cutting controlling unit 104 of the control system 10 (shown in FIG. 5).

Action 1005: In optional Action 1005—which may follow upon Action 1003 of providing one or more fixation lines 5, upon Action 1004 of cutting along the one or more fixation lines 5, and/or potentially upon Action 1002 of providing a drop stitch fabric 3—a respective portion 71 of one or more non-inflatable elements 7 may be provided along at least a portion of the one or more fixation lines 5. An example of such a non-inflatable element 7 is depicted in FIG. 2, and further in FIG. 4 which illustrates a schematic side view of a portion of an exemplifying inflatable structure 1 according to embodiments of the disclosure. Although in FIG. 4 the drop stitches 4 in vicinity of the one or more fixation lines 5 are illustrated as shorter, it may be noted that the length 41 of the drop stitches 4 may be constant across the drop stitch fabric 3.

Since a respective portion 71 of one or more non-inflatable elements 7 may be provided along at least a portion of the one or more fixation lines 5, portions 71—such as edges—of additional elements 7 intended to be part of the inflatable structure 1, may be integrated during the manufacturing process in a convenient manner. That is, since non-inflatable element(s) 7 may be provided along the fixation line(s) 5 prior to the drop stitch fabric 3 and the fixation line(s) 5 being coated, portions 71 of the non-inflatable element(s) 7 provided along the fixation line(s) 5 are coated together with coating of the drop stitch fabric 3 and the fixation line(s) 5. The portions 71 of the non-inflatable element(s) 7 provided along the fixation line(s) 5 thereby become sealed and integrated with the inflatable structure 1 and/or the drop stitch fabric 3 thereof, thus rendering subsequent—commonly known—additional gluing, patching and/or sealing of such portions unnecessary. That is, rather than—as known in the art—attaching one or more non-inflatable elements to an inflatable product and/or a drop stitch fabric thereof after coating of said fabric, thus implying that subsequent gluing and/or sealing—e.g. by means of patches—of said non-inflatable elements is required, the introduced approach makes such subsequent gluing and/or sealing unneeded.

The one or more non-inflatable elements 7 may be represented by any elements—e.g. known in the art—feasible for integration with the inflatable structure 1. Similarly, dimensions and/or characteristics of the non-inflatable element(s) 7 may be arbitrary and vary with the inflatable structure 1 at hand. A non-inflatable element 7 may for instance be represented by a sheet and/or a film, e.g. a transparent plastic sheet and/or film, and/or a net, e.g. adapted to function as a see-through section of the inflatable structure 1. To integrate the non-inflatable element(s) 7 with the inflatable structure 1 and/or the drop stitch fabric 3 thereof along the one or more fixation lines 5, a portion 71 of respective non-inflatable element 7 of any proportion as deemed suitable for sufficient integration with and/or attachment to the corresponding non-inflatable element 7, inflatable structure 1 and/or fixation line(s) 5, may be provided along the corresponding fixation line 5. Such a portion 71 of a non-inflatable element 7 may accordingly be of any preselectable dimensions, which may vary along the fixation line(s) 5, and for instance range from a few millimetres up to tens or even hundreds of millimetres. Providing a respective portion 71 of one or more non-inflatable elements 7 along at least a portion of the one or more fixation lines 5, may be accomplished in any manner deemed suitable for the inflatable structure 1 at hand, e.g. with support from a—potentially known—element providing system and/or machine 15 (shown in FIG. 5), and/or potentially by hand. Providing a one or more non-inflatable elements 7 may, according to an example, comprise welding, such as welding a respective portion 71 of one or more non-inflatable elements 7 along at least a portion of the one or more fixation lines 5, e.g. by means of welds and/or weld spots.

Optionally, however, providing a respective portion 71 of one or more non-inflatable elements 7 may comprise placing the respective portion(s) 71 of the one or more non-inflatable elements 7 between the first layer 31 and the second layer 32, prior to Action 1003 of providing one or more fixation lines 5. Thereby, the portion(s) 71 of the one or more non-inflatable elements 7 may be attached to the drop stitch fabric 3 by the one or more fixation lines 5 fixating the first layer 31 to the second layer 32. Thereby, portions 71—such as edges—of additional elements 7 intended to be part of the inflatable structure 1, may be integrated during the manufacturing process in an even more convenient manner, in that the exemplifying optional welding discussed above of portions 71 of the one or more non-inflatable elements 7, to portions of the one or more fixation lines 5, may be unnecessary. That is, since portions 71 of non-inflatable element(s) 7 may be inserted between the first layer 31 and the second layer 32 along the fixation line(s) 5 prior to the first layer 31 being fixated to the second layer 32 by the coupling means 51, portions 71 of the non-inflatable element(s) 7 intermediate the first and second layers 31, 32 become fixated between said layers 31, 32 together with the fixation of the first layer 31 to the second layer 32.

The expression "providing" a respective portion of one or more non-inflatable elements may refer to "attaching" and/or "inserting" a respective portion of one or more non-inflatable elements, and further to "providing with support from an element providing system and/or machine" a respective portion of one or more non-inflatable elements. Moreover, "providing" a respective portion of one or more non-inflatable elements may refer to "providing, prior to coating of the drop stitch fabric" a respective portion of one or more non-inflatable elements. Respective "portion", on the other hand, may refer to respective "proportion", whereas "a respective" portion may refer to "one or more" portions. The expression "element" may refer to "component" and/or "part", whereas elements "along" at least a portion may refer to elements "in" at least a portion. "Portion" of the one or more fixation lines may refer to "section" of the one or more fixation lines.

Action 1005 of providing one or more non-inflatable elements 7 may potentially be controlled by means of an element controlling unit 105 of the control system 10 (shown in FIG. 5).

Further shown in FIG. 2 is optional exemplifying folding lines 8. The one or more folding lines 8 comprises folding line coupling means 81 coupling the first layer 31 to the second layer 32. Dimensions of the one or more folding lines 8 and/or folding line coupling means 81 are adapted to enable the inflatable structure 1 to in both the deflated state and the inflated state be foldable along the one or more folding lines 8. Thereby, in addition to the drop stitches 4 tethering the first layer 31 to the second layer 32, folding lines coupling means 81 of one or more folding lines 8 additionally couple the first layer 31 to the second layer 32. As a result thereof, characteristics and/or properties of the inflatable structure 1 and/or the drop stitch fabric 3 are altered and/or different along the folding lines 8 as compared to where folding lines 8 are not present. Thus, the folding lines 8 are designed to represent suitable elongated folding locations, and to support folding in a manner superior as compared to folding where said lines 8 are not present. Accordingly, there may be provided distinct lines 8 across portions of the drop stitch fabric 8, along which lines 8 folding is advantageous. As a result thereof, the inflatable structure 1 may be folded in a controlled predeterminable manner along the one or more folding lines 8, and/or along elongations thereof 8. Accordingly, since the inflatable structure 1 is foldable in the deflated state along the one or more folding lines 8, material stress and potentially cracks commonly experienced on inflatable structures of the prior art from uncontrolled rolling and/or wrapping in a deflated state, may be avoided. Moreover, since the inflatable structure 1 then is foldable also in the inflated state along the one or more folding lines 8, a complex inflatable product 1 may be derived from a single drop stitch fabric 3, rather than—as commonly known in the art—by connecting e.g. gluing together multiple drop stitch structures of separate drop stitch fabrics into a final inflatable product.

The one or more folding lines 8 may respectively be of any form and/or design deemed suitable for the inflatable structure 1 at hand, and for instance respectively be essentially straight. Correspondingly, the folding line coupling means 81 may be represented by any coupling members enabling the first layer 31 to be coupled, be attached, be fixated and/or in an additional or alternative manner be tethered to the second layer 32 along the folding lines 8. The dimensions of the one or more folding lines 8 and/or folding line coupling means 81 may be selected in any manner deemed suitable for the inflatable structure 1 at hand to support that the inflatable structure 1 in both the deflated state and the inflated state is foldable along the one or more folding lines 8. The dimensions may for instance relate to magnitudes of the one or more folding lines 8, such as to what extent a respective folding line 8 extends, to what extent a coupling means 81 extends, a separation distance between two adjacent coupling means 81, a width of a respective folding line 8, and/or a length—e.g. in the inflated state—between the first layer 31 and the second layer 32 along respective folding line 8, all of which respectively and/or combined may affect the foldability along the folding lines 8. The number of folding lines 8 may be selected as deemed suitable for the inflatable structure 1 at hand. The number of folding lines 8 may hence range from e.g. a single folding line up to several or even tens or hundreds of folding lines 8. In FIG. 2, two exemplifying folding lines 8 are depicted.

The one or more folding lines 8 may be provided in any manner deemed suitable for the inflatable structure 1 at hand, e.g. with support from a—potentially known—folding line providing machine and/or system (not shown)—such as e.g. a sewing, welding and/or weaving machine and/or system—and/or potentially by hand. Correspondingly, providing the optional one or more folding lines 8 may potentially be controlled by means of a folding line controlling unit (not shown) of the control system 10 (shown in FIG. 5). The one or more folding lines 8 may for instance comprise one or more seams, and the folding line coupling means 81 comprise stitches. According to another example, the folding line coupling means 81 may comprise and/or be represented by welds and/or weld spots, whereby the one or more folding lines 8 may be represented by one or more welding lines. In a similar manner, according to another example, the folding line coupling means 81 may additionally or alternatively comprise and/or be represented by drop stitches of reduced length, whereby the one or more folding lines 8 may be represented by one or more lines with drop stitches of reduced length. The one or more folding lines 8 may be made in a similar way as the fixation lines 5 described herein.

The expression "the inflatable structure" is provided with one or more folding lines may refer to "the drop stitch fabric of the inflatable structure" is provided with one or more folding lines, whereas "is provided with" one or more folding lines may refer to "having provided thereon" one or more folding lines. One or more "folding lines", on the other hand, may refer to one or more "elongated folding lines", and further to one or more "essentially straight folding lines". Moreover, one or more "folding lines" may refer to one or more "strips", "dividing lines", "parting lines" and/or "splitting lines". According to an example, one or more "folding lines" may further refer to one or more "seams, welding lines and/or lines with drop stitches of reduced drop stitches length". "Folding line coupling means", on the other hand, may refer to "folding line coupling members", "folding line couplings" and/or "folding line couplers", whereas "coupling" the first layer to the second layer in this context may refer to "coupling narrower and/or tighter than the drop stitches" the first layer to the second layer. Moreover, "coupling" the first layer to the second layer may in this context refer to "bonding", "fixating", "attaching" and/or "tethering and/or tethering in an alternative manner" the first layer to the second layer. "Be foldable" may refer to "to some extent be foldable" and/or "be foldable in a controlled, predetermined, predeterminable and/or expected manner".

As further shown in FIG. 5, which depicts a schematic block diagram illustrating the exemplifying control system 10 according to embodiments of the disclosure, the control system 10 comprises the contour determining unit 101, the drop stitch controlling unit 102, the coupling controlling unit 103, the optional cutting controlling unit 104, the optional element controlling unit 105, and the coating controlling unit 106 described herein. Furthermore, embodiments herein for controlling manufacturing of an inflatable structure 1, may be implemented through one or more processors, such as a processor 107, here denoted CPU, together with computer program code for performing the functions and actions of embodiments herein. Said program code may also be provided as a computer program product, for instance in the form of a data carrier carrying computer program code for performing the embodiments herein when being loaded into the control system 10. One such carrier may be in the form of a CD ROM disc or DVD. It is however feasible with other data carriers such as a memory stick. The computer program code may furthermore be provided as pure program code on a server and downloaded to the control system 10. The control system 10 may further comprise a memory 108 comprising one or more memory units. The memory 108 may be arranged to be used to store e.g. information, and further to store data, configurations, schedulings, and applications, to perform the methods herein when being executed in the control system 10. Furthermore, the units 101, 102, 103, 104, 105, 106 discussed above, the optional processor 107 and/or the optional memory 108, may for instance at least partly be implemented in in one or more control units 109 e.g. comprised in and/or integrated with a manufacturing machine and/or distributed among a plurality thereof. Those skilled in the art will also appreciate that said units 101, 102, 103, 104, 105, 106 may refer to a combination of analog and digital circuits, and/or one or more processors configured with software and/or firmware, e.g. stored in a memory such as the memory 108, that when executed by the one or more processors such as the processor 107 perform as described in conjunction with FIG. 1. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 5 is the optional drop stitching system 11, the optional coupling applying system 12, the optional coating applying system 13, the optional cutting system 14 and the optional element providing system 15, discussed in conjunction with FIG. 1.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method for manufacturing an inflatable product, the method comprising:
   determining one or more contours of the inflatable product to be manufactured;
   providing a single drop stitch fabric having a first layer and a second layer tethered by drop stitches, the single drop stitch fabric having a layer area greater than an area defined by outer contours of the one or more contours of the inflatable product to be manufactured such that all drop stitch fabric of the inflatable product is continuous and included in the single drop stitch fabric;
   placing a respective portion of one or more non-inflatable elements between the first layer and the second layer;
   providing along at least a portion of the single drop stitch fabric one or more fixation lines comprising coupling means fixating the first layer to the second layer and each of the first layer and the second layer to the respective portion of the one or more non-inflatable elements, the one or more fixation lines corresponding to the one or more contours, thereby edges of inner and/or outer perimeters of the inflatable product being formed, a geometry of the inflatable product being thereby defined and fixed by the one or more fixation lines, thus rendering the single drop stitch fabric manageable for further processing; and
   coating the single drop stitch fabric with one or more coating layers to cover at least the one or more fixation lines fixating the first layer to the second layer and each of the first layer and the second layer to the respective portion of the one or more non-inflatable elements such that the inflatable product becomes airtight and gas proof during use.

2. The method according to claim 1, wherein the providing one or more fixation lines comprises providing one or more seams comprising stitches.

3. The method according to claim 1, further comprising:
   cutting along at least a portion of the one or more fixation lines for removal of residue drop stitch fabric.

4. The method according to claim 3,
   wherein the cutting along the one or more fixation lines comprises controlling cutting of the one or more fixation lines by means of a cutting controlling unit comprised in a control system.

5. The method according to claim 3, wherein the cutting along the one or more fixation lines comprises cutting along the one or more fixation lines with support from a cutting system and/or machine.

6. The method according to claim 1, wherein one or more steps of the method is performed by a control system for controlling the manufacturing,
   wherein the determining one or more contours comprises determining one or more contours by means of a contour determining unit comprised in the control system; and/or
   wherein the providing a single drop stitch fabric comprises controlling drop stitching of a single drop stitch fabric by means of drop stitch controlling unit comprised in the control system; and/or
   wherein the providing one or more fixation lines comprises controlling provision of one or more fixation lines by means of a coupling controlling unit comprised in the control system; and/or
   wherein the coating the single drop stitch fabric comprises controlling coating of the single drop stitch fabric by means of a coating controlling unit comprised in the control system.

7. The method according to claim 1,
   wherein the providing one or more non-inflatable elements comprises controlling providing of one or more non-inflatable elements by means of an element controlling unit comprised in a control system.

8. The method according to claim 1, wherein the providing a single drop stitch fabric comprises providing a single drop stitch fabric with support from a drop stitching system and/or machine.

9. The method according to claim 1, wherein the providing one or more fixation lines comprises providing one or more fixation lines with support from a coupling applying system and/or machine.

10. The method according to claim 1, wherein coating the single drop stitch fabric comprises coating the coupling means of the one or more fixation lines together with the single drop stitch fabric and at least a portion of the one or more non-inflatable elements.

11. The method according to claim 1, wherein the inflatable product is configured as at least one of an inflatable pet cage, an inflatable child restraint, an inflatable kayak, or an inflatable gym mat.

* * * * *